(12) United States Patent
Tamaki et al.

(10) Patent No.: US 7,882,458 B2
(45) Date of Patent: Feb. 1, 2011

(54) POWER CONSUMPTION ANALYZING METHOD AND COMPUTER-READABLE STORAGE MEDIUM

(75) Inventors: Kazuhide Tamaki, Kawasaki (JP); Ryuji Fujita, Kawasaki (JP); Junichi Niitsuma, Kawasaki (JP); Takayuki Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 661 days.

(21) Appl. No.: 11/907,822

(22) Filed: Oct. 17, 2007

(65) Prior Publication Data

US 2008/0127001 A1    May 29, 2008

(30) Foreign Application Priority Data

Nov. 28, 2006 (JP) ............................. 2006-320467

(51) Int. Cl.
*G06F 17/50* (2006.01)
(52) U.S. Cl. .............................................. 716/2; 716/4
(58) Field of Classification Search .................. 716/2, 716/4
See application file for complete search history.

(56) References Cited

U.S. PATENT DOCUMENTS

2005/0204316 A1* 9/2005 Nebel et al. ..................... 716/2
2006/0277509 A1* 12/2006 Tung et al. ...................... 716/5
2007/0250798 A1* 10/2007 Chaudhry et al. .............. 716/4

FOREIGN PATENT DOCUMENTS

JP         2002-92065         3/2002

OTHER PUBLICATIONS

Chaudhry et al.; "A Cycle Accurate Power Estimation Tool"; 2006; IEEE; Version 8D-3; pp. 867-870.*
Zhong et al.; "Power Estimation for Cycle-Accurate Functional Descriptions of Hardware"; 2004; IEEE; pp. 668-675.*
Zhong et al.; "RTL-Aware Cycle-Accurate Functional Power Estimation"; Oct. 2006; IEEE; pp. 2103-2117.*

* cited by examiner

*Primary Examiner*—Sun J Lin
*Assistant Examiner*—Suresh Memula
(74) *Attorney, Agent, or Firm*—Staas & Halsey LLP

(57) ABSTRACT

A power consumption analyzing method, to be implemented by a computer, is for a circuit developing procedure that makes a logic design of the circuit in an RTL design stage and inserts a gated clock with respect to the circuit in a subsequent logic synthesis stage. The method comprises an extraction step, implemented by the computer, extracting a signal which is judged that it will be transformed into a gated clock in the logic synthesis stage, and storing the signal in a memory part, a measuring step, implemented by the computer, measuring an valid time of the signal stored in the memory part by a logic simulation, and storing the valid time in the memory part, and a post-simulation step, implemented by the computer, computing a power consumption analysis result of the circuit from the valid time stored in the memory part, a number of registers for each of modules that are function units forming the circuit, and a memory capacity coefficient indicating an extent to which a memory capacity within the circuit affects the power consumption of the circuit, and outputting the power consumption analysis result.

13 Claims, 14 Drawing Sheets

RTL DESIGN INFO — 21

```
reg [3:0] Q1;  ⎫ Total number of
reg Q2;        ⎭ registers is 5 always @(posedge CK or negedge RST) begin
   if(~RST)
        Q1 = 0;
   else if(EN)   ← Extract such a portion
        Q1 = DN1;
end
```

⇩ Logic Synthesis

FIG.11

RTL DESIGN INFO (21)

```
always @(posedge CK) begin
    if(EN1) begin
        if(EN2 == 2'b01)
            Q1 <= D1;
        else if(EN2 == 2'b10)
            Q1 <= D2;
    end
end
```

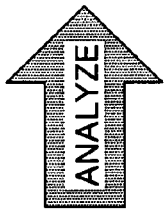
ANALYZE

GCLK & PATH INFO (23)

Store & simultaneously substitute signal added with hierarchical path into unique signal name

```
// path info
wire UU1_EN1 = U1.U2.EN1;     ← PATH INFO
wire [1:0] UU2_EN2 = U1.U2.EN2;

Analyze core & create signal that can become 1 GCLK wire UU2T_EN2 = (UU2_EN2 == 2'b01) ? 1'b1 : (
                (UU2_EN2 == 2'b10) ? 1'b1 : 1'b0);

//***** gclk signal******
wire UU1T_EN1 = UU1_EN1 & UU2T_EN2     ← ENABLE SIGNAL NAME
```

FIG.12

```
// U1.U2 info
wire UU1_EN1 = U1.U2.EN1;
wire [1:0] UU2_EN2 = U1.U2.EN2;
wire UU2T_EN2 = (UU2_EN2 == 2'b01) ? 1'b1 : (
                (UU2_EN2 == 2'b10) ? 1'b1 : 1'b0);
//***** gclk signal******
wire UU1T_EN1 = UU1_EN1 & UU2T_EN2
```

Count enable time

```
always @(posedge sclk or negedge xrst) begin
  if(~xrst)
      UU1T_EN1_counter <= 0;
  else if(UU1T_EN1)
      UU1T_EN1_counter <= UU1T_EN1_counter + 1;
end
```

Provide counter for all enable signals EN in the above described matter.

Add value of counter for each module.

```
assign UU1_total = UU1T_EN1_counter + UU1_EN2_counter
                 + UU1_EN3_counter;
assign UU2_total = UU2T_EN1_counter + UU2_EN2_counter
                 + UU2_EN3_counter;
```

FIG.13

```
master_counter = [signal -get master_counter¥[5:0¥]] >> out_file
UU1_total = [signal -get UU1_total¥[5:0¥]] >> out_file
UU2_total = [signal -get UU2_total¥[5:0¥]] >> out_file
UU3_total = [signal -get UU3_total¥[5:0¥]] >> out_file
xxxxxxxxx >> out_file
```
~32

FIG.14

```
master_counter = 10000
UU1_total = 50
UU2_total = 123
UU3_total = 34
xxxxxxxxx
master_counter = 10000
UU1_total = 28
UU2_total = 335
UU3_total = 87
xxxxxxxxx
master_counter = 10000
UU1_total = 46
UU2_total = 66
```
~25

POWER CONSUMPTION ANALYZING METHOD AND COMPUTER-READABLE STORAGE MEDIUM

BACKGROUND

1. Field

The embodiment generally relates to power consumption analyzing methods and computer-readable storage media, and more particularly to a power consumption analyzing method that is suited for analysis and estimation of a power consumption during a development stage of a semiconductor integrated circuit, and to a computer-readable storage medium which stores a program for causing a computer to carry out such a power consumption analyzing method.

2. Description of the Related Art

Recently, it has become important to reduce the power consumption of semiconductor integrated circuits to cope with the increased circuit scale and to enable use in portable equipments that are driven by batteries.

Generally, the logic operation of the semiconductor integrated circuit is designed by Register Transfer Level (RTL) in the Hardware Description Language (HDL). In the RTL design stage, the architecture of the circuit needs to be determined as the specifications, and the power consumption of the circuit is affected by the structure of the architecture. Accordingly, it is necessary to study and evaluate whether or not the architecture of the circuit is an optimum architecture from the point of view of reducing the power consumption, in the RTL design stage or in a stage prior to the RTL design stage.

In the recent semiconductor integrated circuits, the gated clock, which blocks the input of the clock to the flip-flop, is employed in order to reduce the power consumption. As methods of inserting the gated clock, there is a method in which the designer explicitly inserts the gated clock in the RTL description stage, a method in which a logic synthesis tool inserts the gated clock by automatically transforming an enable signal of the flip-flop during a synthesis process, and a method which combines these two methods. As the performance of the logic synthesis tool improves, it is expected that the mainstream of the design flow will insert the gated clock using the logic synthesis tool.

For example, a Japanese Laid-Open Patent Application No. 2002-92065 proposes a circuit design method which inserts the gated clock with respect to the flip-flop.

FIG. 1 is a diagram for explaining a conventional semiconductor integrated circuit developing procedure. The developing procedure shown on the left side in FIG. 1 includes an RTL design stage 1, a logic synthesis stage 2, a net list generating stage 3, a layout generating stage 4, and a net list generating stage 5. It is assumed for the sake of convenience that the logic synthesis stage 2 inserts the gated clock with respect to the semiconductor integrated circuit by using a logic synthesis tool.

FIG. 2 is a diagram showing a power consumption analysis result 11 that is obtained by analyzing the power consumption of modules m1 through m3 in the RTL design stage 1, where the modules m1 through m3 are function units forming the circuit in the RTL design stage 1. In FIG. 2, the ordinate indicates the power consumption in mV, and the abscissa indicates the simulation cycle in arbitrary units. On the other hand, FIG. 3 is a diagram showing a power consumption analysis result 12 that is obtained by analyzing the power consumption of modules m1 through m3 in the net list generating stage 5, where the modules m1 through m3 are function units forming the circuit in the net list generating stage 5. In FIG. 3, the ordinate indicates the power consumption in mV, and the abscissa indicates the simulation cycle in arbitrary units. In addition, the measured result of the power consumption of the semiconductor integrated circuit that is created after the developing procedure, that is, the actual device, becomes approximately the same as the power consumption analysis result 12.

In the logic synthesis stage 2, when inserting the gate clock with respect to the semiconductor integrated circuit using the logic synthesis tool, considerable differences are introduced between the power consumption analysis result 11 in the RTL design stage 1 and the power consumption analysis result 12 in the net list generating stage 5 after the logic synthesis stage 2 for the power consumption value, the power consumption change, the power consumption ratio between the modules forming the circuit and the like, due to the effects of the gated clock that is inserted with respect to the circuit in the logic synthesis stage 2, as may be seen by comparing the power consumption analysis results 11 and 12 shown in FIGS. 2 and 3.

According to the semiconductor integrated circuit developing procedure, the power consumption analysis result in the RTL design stage and the power consumption analysis result in the net list generating stage after the logic synthesis stage greatly differ, due to the effects of the gate clock that is inserted with respect to the circuit in the logic synthesis stage. For this reason, even if the architecture of the circuit is modified in the RTL design stage in order to reduce the power consumption, it is difficult to comprehend the extent to which the modification of the architecture affects the actual device, and there was a problem in that it is difficult to optimize the architecture of the circuit in the RTL design stage.

SUMMARY

One embodiment provides that a power consumption analyzing method including that extracting a signal judged whether the signal is transformed into a gated clock in a logic synthesis stage, storing the signal in a memory part, measuring a valid time of the signal stored in the memory part by a logic simulation, storing the valid time in the memory part, and computing a power consumption analysis result of the circuit from the valid time stored in the memory part, a number of registers for each of modules that are function units forming the circuit, and a memory capacity coefficient indicating an extent to which a memory capacity within the circuit affects the power consumption of the circuit.

BRIEF DESCRIPTION OF THE DRAWINGS

FIG. 11 is a diagram for generally explaining the extraction process;

FIG. 12 is a diagram for explaining generation of the test bench;

FIG. 13 is a diagram showing a counter read command file that is used when executing an emulation;

FIG. 14 is a diagram showing a counted value file that is an output of an emulation result;

DESCRIPTION OF THE PREFERRED EMBODIMENTS

One embodiment artificially computes a change in the power consumption (or power consumption change) after the gated clock is inserted with respect to the circuit in the RTL design stage of the circuit developing procedure, so that the architecture of the circuit can be optimized in the RTL design stage.

In other words, a signal which is judged that it will be transformed into an enable signal of the gated clock by a logic synthesis tool, is extracted from the RTL, and an valid time (or enable time, or effective time) of the extracted signal is measured by a logic simulation. The power consumption value, the power consumption change, the power consumption ratio among the modules forming the circuit and the like are computed from the measured valid time, the number of registers for each of the modules that are function units forming the circuit, and the memory capacity coefficient.

Next, a description will be given of embodiments of the power consumption analyzing method and the computer-readable storage medium according to the embodiment, by referring to FIG. 4 and the subsequent drawings.

One embodiment of the power consumption analyzing method according to the embodiment employs one embodiment of the computer-readable storage medium according to the embodiment which stores a program of the embodiment. FIG. 4 is a perspective view showing a computer system to which the embodiment is applied.

Figure 4:
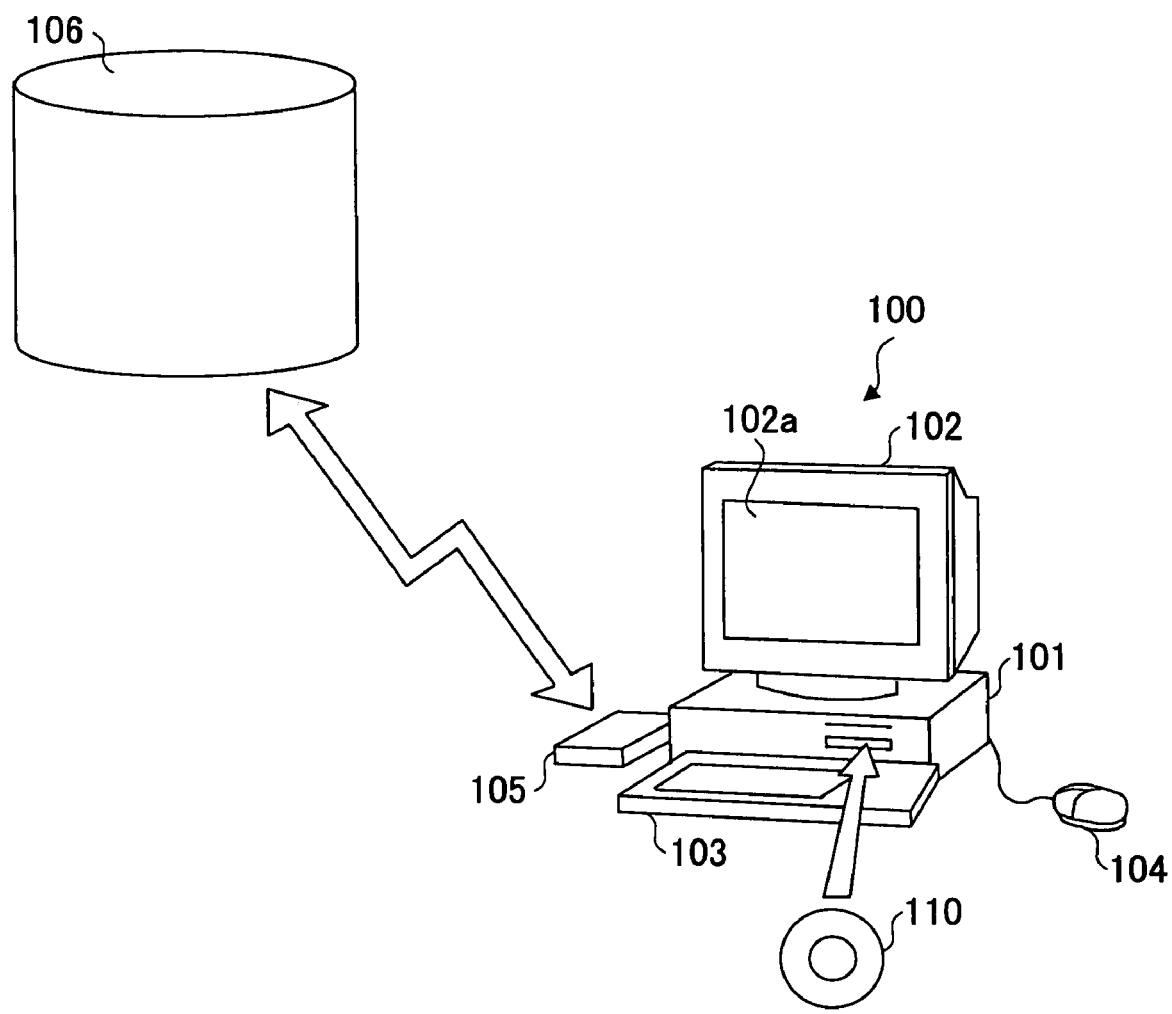
FIG. 4 is a perspective view showing a computer system to which the embodiment is applied.

A computer system 100 shown in FIG. 4 has a main body 101 having a built-in CPU, disk drive and the like, a display 102 for displaying the power consumption analysis result and the like on a display screen 102a in response to an instruction received from the main body 101, a keyboard 103 for inputting various information to the computer system 100, a mouse 104 for specifying an arbitrary position on the display screen 102a of the display 102, and a modem 105 for accessing an external database or the like and for downloading programs and the like stored in other computer systems.

A program (power consumption analyzing software or tool) for causing the computer system 100 to have at least a power consumption analyzing function, is input to the computer system 100 and compiled therein. This program of the embodiment may be stored in a portable recording medium such as a disk 110 or, downloaded from a recording medium 106 of another computer system using a communication apparatus such as the modem 105. This program causes the computer system 100 (that is, a CPU 201 which will be described later) to operate as a circuit design support apparatus having the power consumption analyzing function. This program may be stored in this embodiment of the computer-readable storage medium, such as the disk 110. The computer-readable storage medium is not limited to portable recording media such as the disk 110, IC card memories, magnetic disks such as floppy disks, magneto-optical disks and CD-ROMs, and includes various recording media that are accessible by a computer system which is connected to the computer system 100 via the communication apparatus or communication means such as the modem 105 and the LAN.

Figure 5:
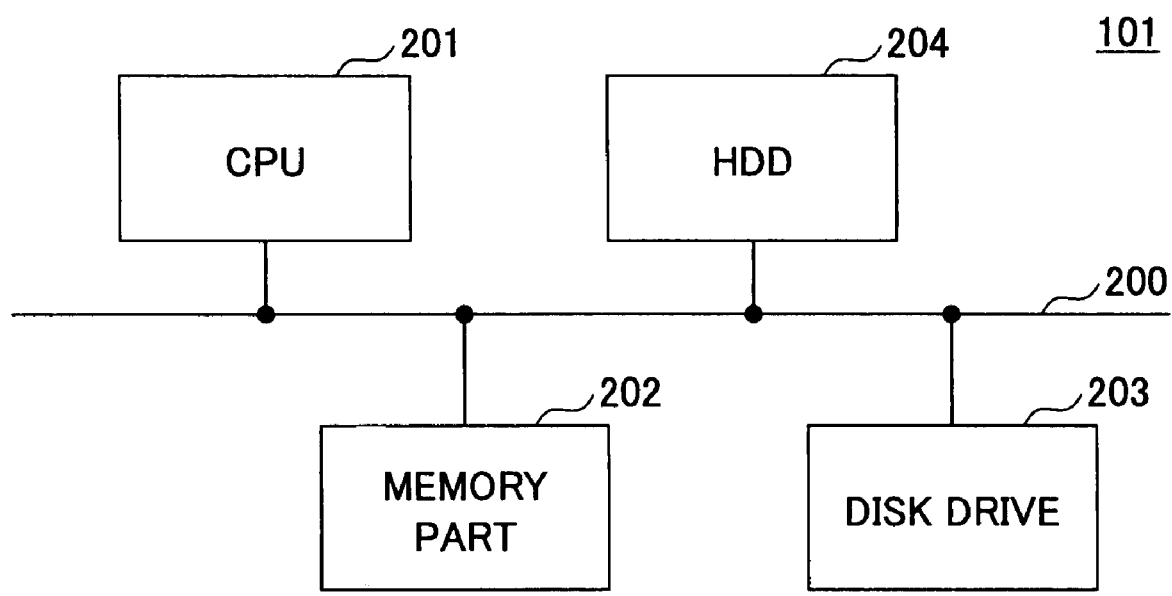
FIG. 5 is a system block diagram showing a structure of an important part of a main body within the computer system.

FIG. 5 is a system block diagram showing a structure of an important part of the main body 101 within the computer system 100. The main body 101 has the CPU 201, a memory part 202 made up of a RAM, a ROM and the like, a disk drive 203 for the disk 110, and a Hard Disk Drive (HDD) 204 that are connected via a bus 200. In this embodiment, the display 102, the keyboard 103 and the mouse 104 are also connected to the CPU 201 via the bus 200, however, each of the display 102, the keyboard 103 and the mouse 104 may be connected directly to the CPU 201. In addition, the display 102 may be connected to the CPU 201 via a known graphic interface (not shown) which processes input and output image data.

In the computer system 100, the keyboard 103 and/or the mouse 104 form an input part (or input means) of the circuit design support apparatus. The display 102 forms a display part (or display means) for displaying the power consumption analysis result and the like on the display screen 102a. The CPU 201 functions as an analyzing part (or analyzing means) for carrying out a power consumption analysis with respect to the circuit in the RTL design stage of the semiconductor integrated circuit developing procedure, that is, in a stage prior to the logic synthesis stage. At least one of the memory part 202, the disk drive 102 and the HDD 204 forms a memory part (or memory means).

The structure of the computer system 100 is of course not limited to the structure shown in FIGS. 4 and 5, and a computer system having any known suitable structure may be used in place of the computer system 100.

Figure 1:
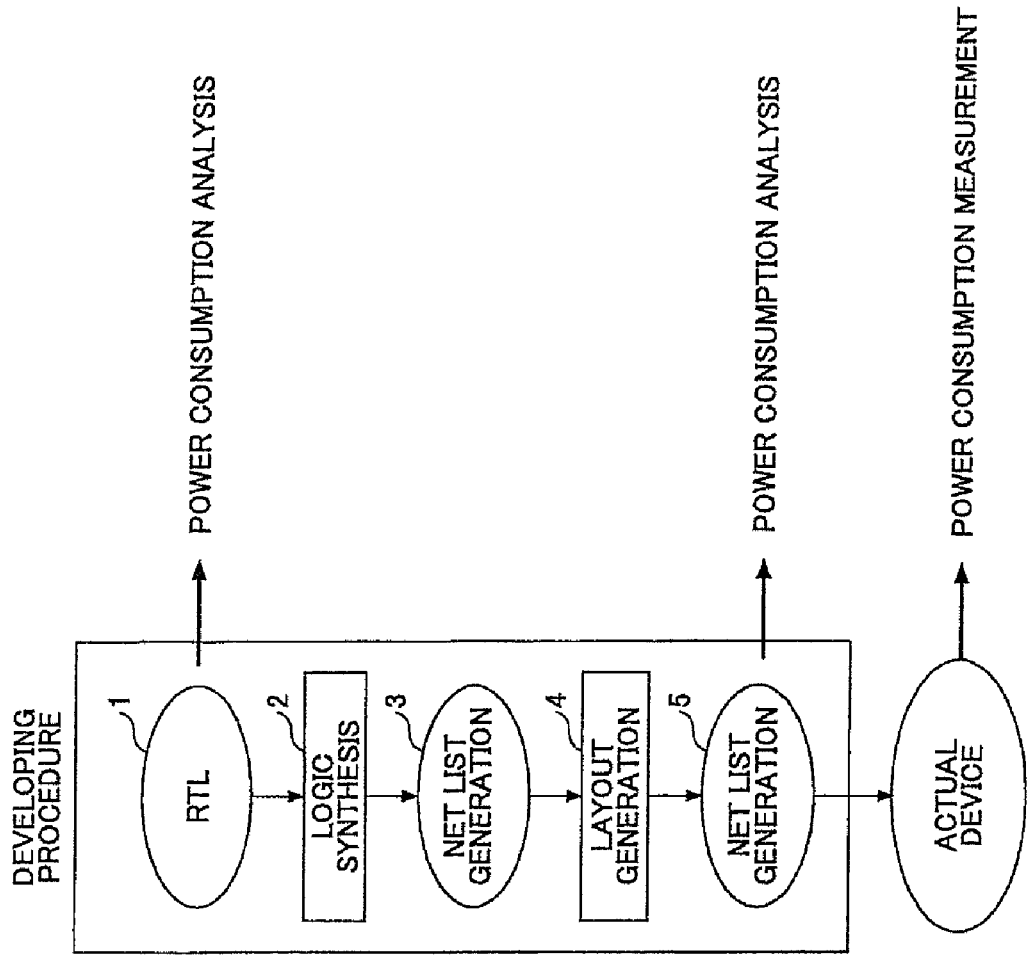
FIG. 1 is a diagram for explaining a conventional semiconductor integrated circuit developing procedure.
Figure 2:
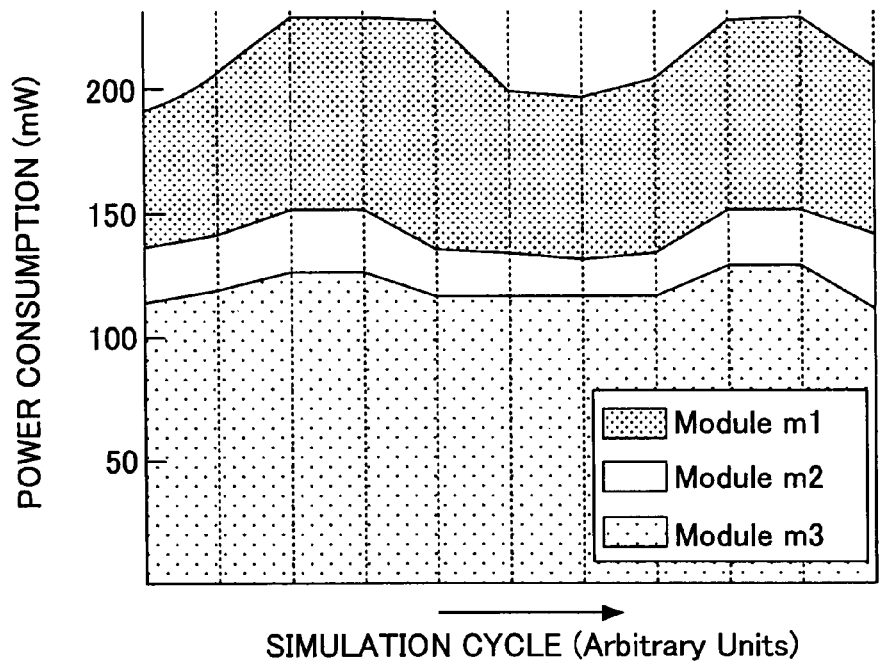
FIG. 2 is a diagram showing a power consumption analysis result that is obtained by analyzing the power consumption in an RTL design stage.
Figure 3:
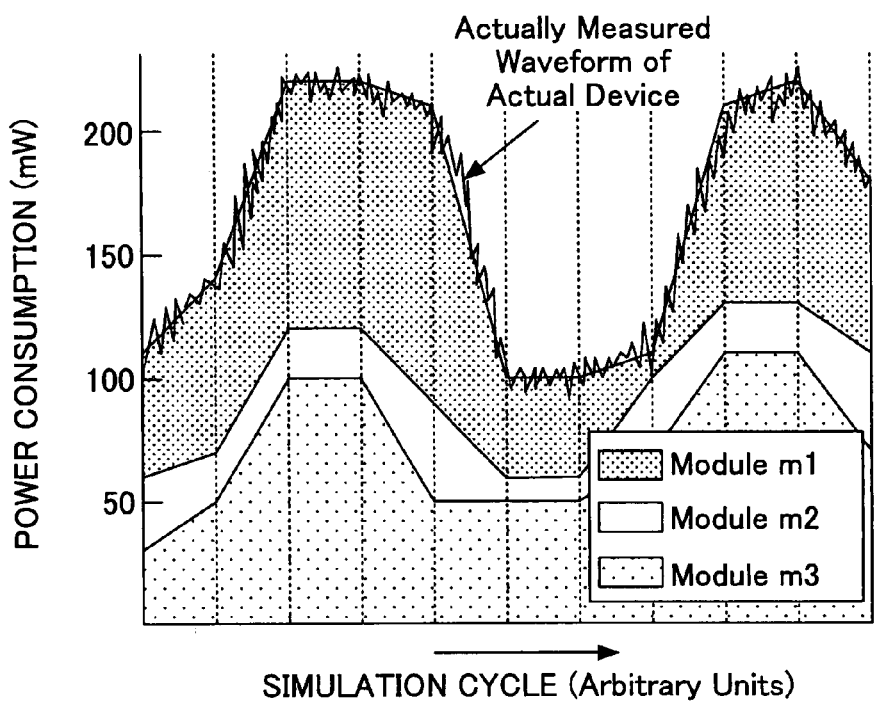
FIG. 3 is a diagram showing a power consumption analysis result that is obtained by analyzing the power consumption in a net list generating stage.
Figure 6:
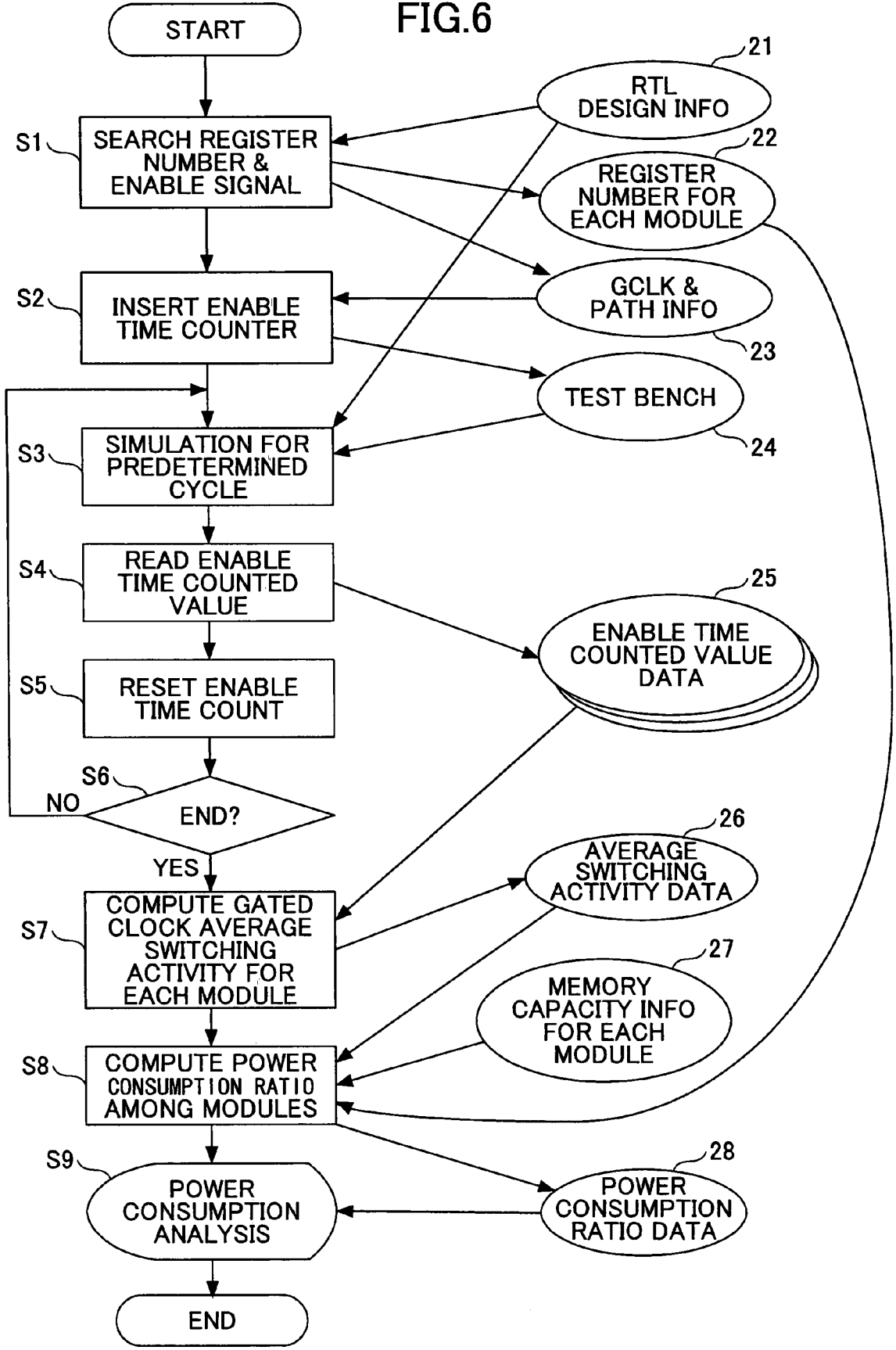
FIG. 6 is a flow chart for explaining a power consumption analyzing process of one embodiment.

FIG. 6 is a flow chart for explaining the power consumption analyzing process of this embodiment. The process shown in FIG. 6 is executed by the CPU 201 in the RTL design stage which carries out the logic design of the circuit in the semiconductor integrated circuit developing procedure shown in FIG. 1, for example, that is, in the stage prior to the logic synthesis stage which inserts the gated clock with respect to the circuit. The power consumption analyzing process shown in FIG. 6 is made up of an extraction process ST1 that includes steps S1 and S2, a simulation process ST2 that includes steps S3 through S6, and a post-simulation process ST3 that includes steps S7 through S9. It is assumed for the sake of convenience that the modules, which are function units forming the semiconductor integrated circuit that is the analyzing target, have a hierarchical structure.

Extraction Process ST1:

In FIG. 6, the step S1 extracts a signal which is judged that it will be transformed into an enable signal of the gated clock after the logic synthesis, from RTL design information 21 that is input from the input part or, is transferred from another computer system and is stored in the memory part. In addition, the step S1 stores in the memory part a signal name GCLK of the extracted signal (or signal GCLK) and path information 23 from a highest hierarchical level of the module in which this signal exists. Furthermore, the step S1 also stores in the memory part a register number 22 that indicates the number of registers for each module.

The step S2 generates a test bench 24 that is provided with a counter for measuring an valid time (or enable time) of the extracted signal, from the signal name GCLK and the path information 23 read from the memory part, and stores the test bench 24 in the memory part.

Simulation Process ST2:

The step S3 executes a simulation by a logic simulator for each predetermined section (that is, predetermined simulation cycle) using the RTL design information 21 and the test bench 24 that are read from the memory part. After completion of the simulation of the predetermined section, the step S4 reads the counted value of the test bench 24, that is, an valid time counted value data 25 and stores the read counted value in the memory part. The step S5 resets the counter of the test bench 24. The step S6 decides whether or not a predetermined simulation time has elapsed and the simulation has ended. The process returns to the step S3 if the decision result in the step S6 is NO. Accordingly, the process of the steps S3 through S5 is repeated until the predetermined simulation time elapses.

Post-Simulation Process ST3:

The step S7 transforms the valid time counted value data 25 into gated clock average switching activity data 26 for each module. The step S8 obtains the power consumption change of the circuit from the gated clock average switching activity data 26 for each module, the register number 22 for each module read from the memory part, and a memory capacity coefficient 27 for each module. The memory capacity coefficient 27 for each module indicates the extent to which the memory capacity within the module affects the power consumption for each module. Since a list of the memory capacities for each of the modules is created at the stage where the specifications of the circuit are determined, it is unnecessary to carry out a process of extracting the memory capacity for each module from the RTL design information 21, for example. It is assumed for the sake of convenience that power consumption ratio data 28 among the modules are obtained as the power consumption change and stored in the memory part. The step S9 forms a graph of the power consumption ratio data 28 among the modules that are read from the memory part, and displays the graph on the display part so as to analyze the power consumption, and the process ends. The power consumption analysis itself may be carried out automatically by the CPU 201 or, carried out manually by the operator or, carried out by a combination of the automatic analysis of the CPU 201 and the manual analysis of the operator.

Figure 7:
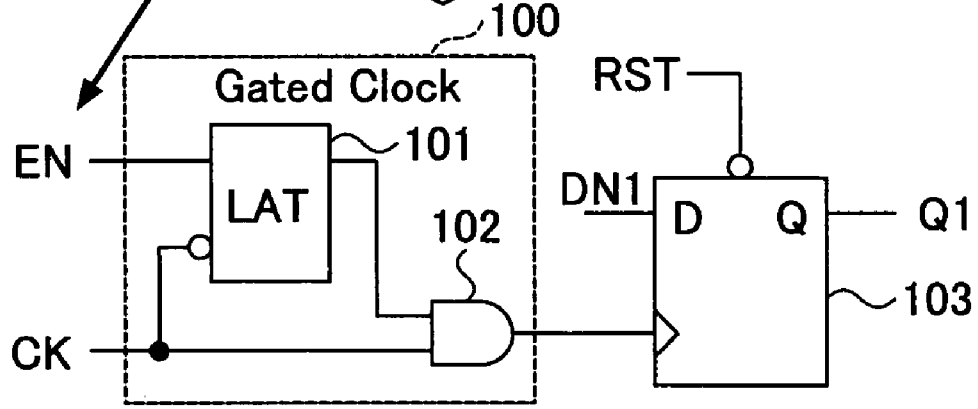
FIG. 7 is a diagram for generally explaining an extraction process.

FIG. 7 is a diagram for generally explaining the extraction process ST1. FIG. 7 shows a case where the RTL is described by the Verilog HDL. In this case, it may be regarded that a condition definition portion of the if statement within the always statement is transformed into the enable signal of the gated clock, and thus, this condition definition portion is extracted.

The Verilog HDL has a register definition description (reg definition description) for each module, and thus, the reg definition description is counted for each module and is output to the file.

The lower portion of FIG. 7 shows the circuit that is generated by subsequent the logic synthesis stage. A gated clock 100 is made up of a latch circuit 101 and an AND circuit 102, and an output of the AND circuit 102 is connected to a clock input terminal of a flip-flop 103. EN denotes the enable signal, CK denotes a clock signal, RST denotes a reset signal, DN1 denotes a D-input to the flip-flop 103, and Q1 denotes a Q-output of the flip-flop 103.

Figure 8:
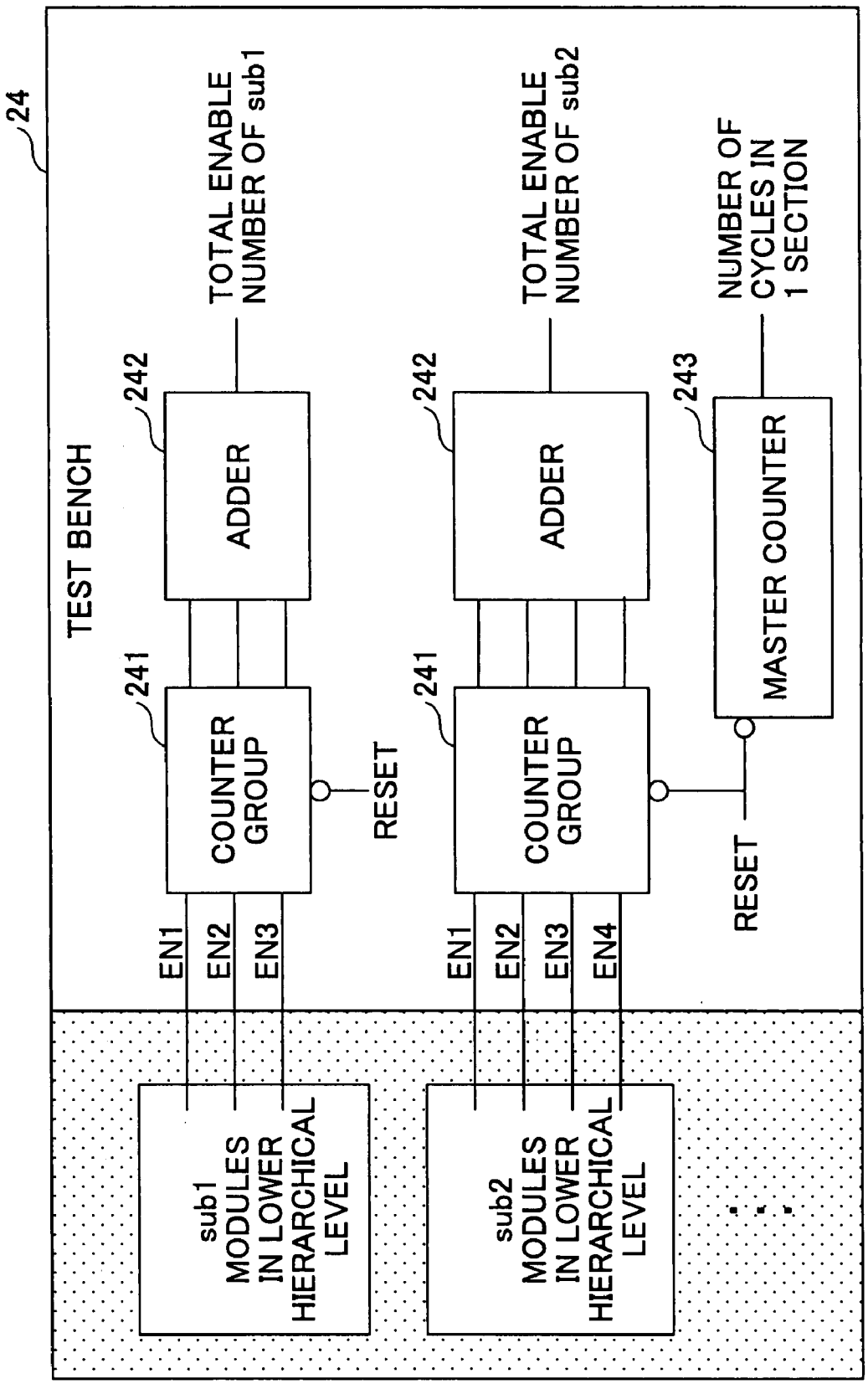
FIG. 8 is a diagram for explaining a test bench.

FIG. 8 is a diagram for explaining the test bench 24. For the sake of convenience, FIG. 8 only shows modules sub1 and sub2 in a lower hierarchical level, of the modules forming the circuit. The test bench 24 has a plurality of counter groups 241. Each counter group 241 is made up of a plurality of counters for measuring the valid times (enable times) of each of the extracted enable signals. In order to reduce the load of the process for reading the values of each of the counters forming the counter group 241 during the simulation process ST2 that is carried out later, the counted values of the counters are added in an adder 242 in units of the modules in the lower hierarchical level, to thereby reduce the number of data to be read out. In this case, a total enable number (a sum total of the counted values in the enable time) of the module sub1 in the lower hierarchical level is obtained from the adder 242 that is provided with respect to the module sub1. In addition, a total enable number (a sum total of the counted values in the enable time) of the module subs in the lower hierarchical level is obtained from the adder 242 that is provided with respect to the module sub2. By dividing the added value from the adder 242 by the number of enable signals and obtaining an average value for each of the modules, it is possible to further reduce the size of the data.

A master counter 243 counts the enable time at a clock frequency at which the circuit operates, and the counted value of the master counter 243 becomes the denominator of the division that is carried out later to obtain the switching activity of the circuit. In other words, the counted value of the master counter indicates the number of cycles of the predetermined section in which the simulation process ST2 is carried out. In a case where the number of cycles of the predetermined section in which the simulation process ST2 is carried out can be recognized without having to count the enable time during the simulation process ST2, such as when the simulation section and the clock frequency are always fixed, it is possible to omit the master counter 243.

The switching activity of the circuit indicates the rate at which the circuit operates, that is, the extent to which the circuit operates.

The switching activity of the circuit originally indicates the number of transitions in the clock per unit time. However, by measuring the enable time of the gated clock, it is possible to convert the counted value of the enable time into the switching activity.

Figure 9:
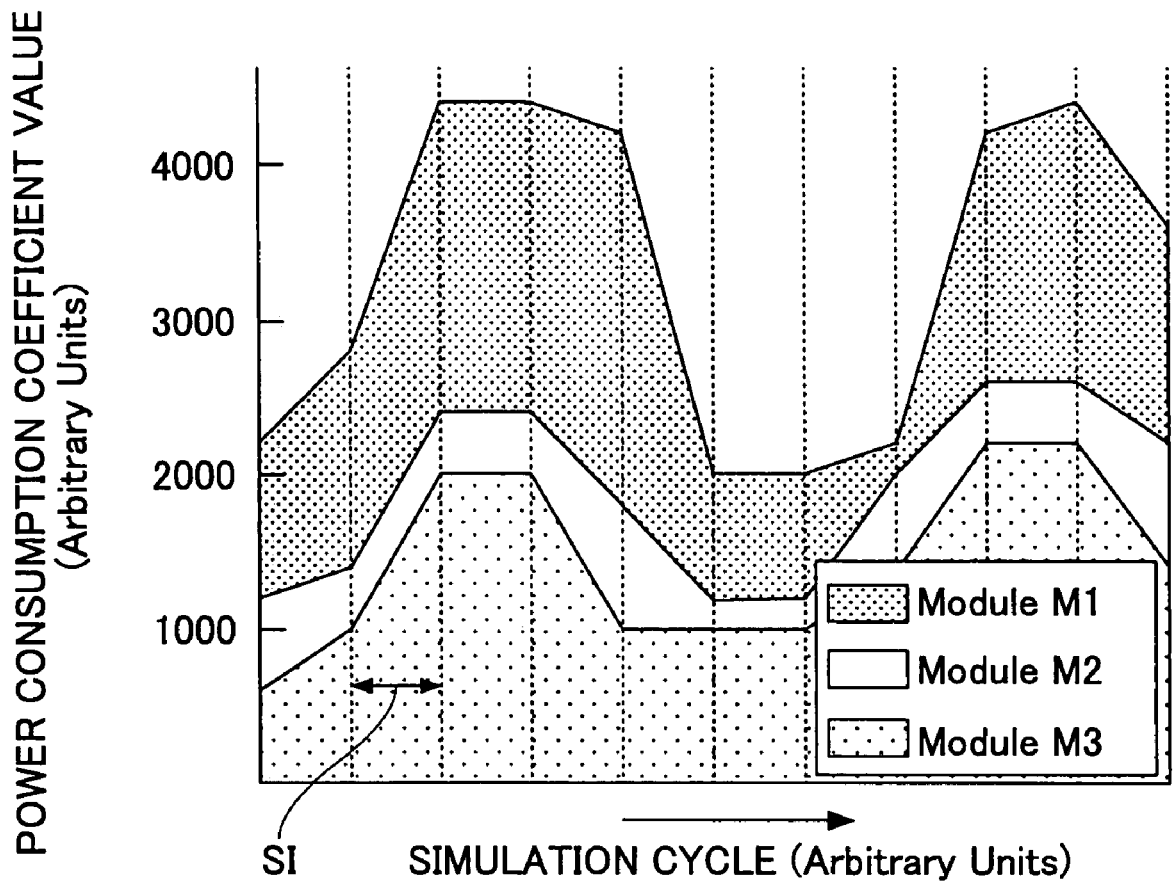
FIG. 9 is a diagram for explaining a predetermined section of a simulation process.

The simulation process ST2 is carried out for each predetermined section, and extracts the counted value described above. The predetermined section is a section SI shown in FIG. 9, for example. FIG. 9 is a diagram for explaining the predetermined section of the simulation process ST2. In FIG. 9, the ordinate indicates the power consumption coefficient value in arbitrary units with respect to modules M1 through M3 forming the circuit, and the abscissa indicates the simulation cycle in arbitrary units. The number of cycles in one section changes depending on the required measuring accuracy. The number of data becomes extremely large if the measurement is made at an extremely high accuracy, and the total simulation time cannot be made long because it would take time to carry out the process of reading the counted value in the simulation process ST2 and to carry out the computation in the post-simulation process ST3. Accordingly, it is desirable to employ a method that measures a relatively long simulation time at a relatively low accuracy, and remeasures only a portion of the simulation time at a relatively high accuracy depending on the results of the measurement made at the relatively low accuracy. The most accurate measuring accuracy (highest accuracy) is obtained when the measurement is made for every 1 cycle.

In the post-simulation process ST3, the following computations are made for each predetermined section of the simulation process ST2 for each module.

(Average Enable Number)=(Total Enable Number)/(Number of Enable Signals For Each Module)

(Switching Activity)=(Average Enable Number)/(Master Counter Value)

(Power Consumption Coefficient Value)=(Register Number)×(Switching Activity)

The memory capacity coefficient indicates the extent to which the memory capacity within the module affects the power consumption of the module, and is computed from a relationship of the register number (or number of ASIC gates) and the memory capacity or the like.

The power consumption coefficient value is used, and not the power consumption, because the power consumption does not yet take place in this state. However, the power consumption change and the power consumption ratio among the modules can be recognized sufficiently from the power consumption analysis result shown in FIG. 9, and may be used to optimize the architecture of the circuit in the RTL design stage. In addition, since it may be regarded that the power consumption is obtainable by subjecting the power consumption analysis result shown in FIG. 9 to a predetermined process, the term "power consumption coefficient value" is used in this specification to refer to the coefficient or parameter (such as the power consumption analysis result shown in FIG. 9) that may be used to obtain the power consumption.

Therefore, this embodiment extracts from the RTL the signal which is judged that it will be transformed into the enable signal of the gated clock by the logic synthesis tool, and measures the valid time (or enable time) of the extracted signal by the logic simulation. The power consumption value, the power consumption change, the power consumption ratio among the modules forming the circuit and the like are computed from the measured valid time, the number of registers for each of the modules that are function units forming the circuit, and the memory capacity coefficient.

Accordingly, by artificially computing the power consumption change after the gated clock is inserted with respect to the circuit in the RTL design stage of the circuit developing procedure, it is possible to optimize the architecture of the circuit in the RTL design stage.

Figure 10:
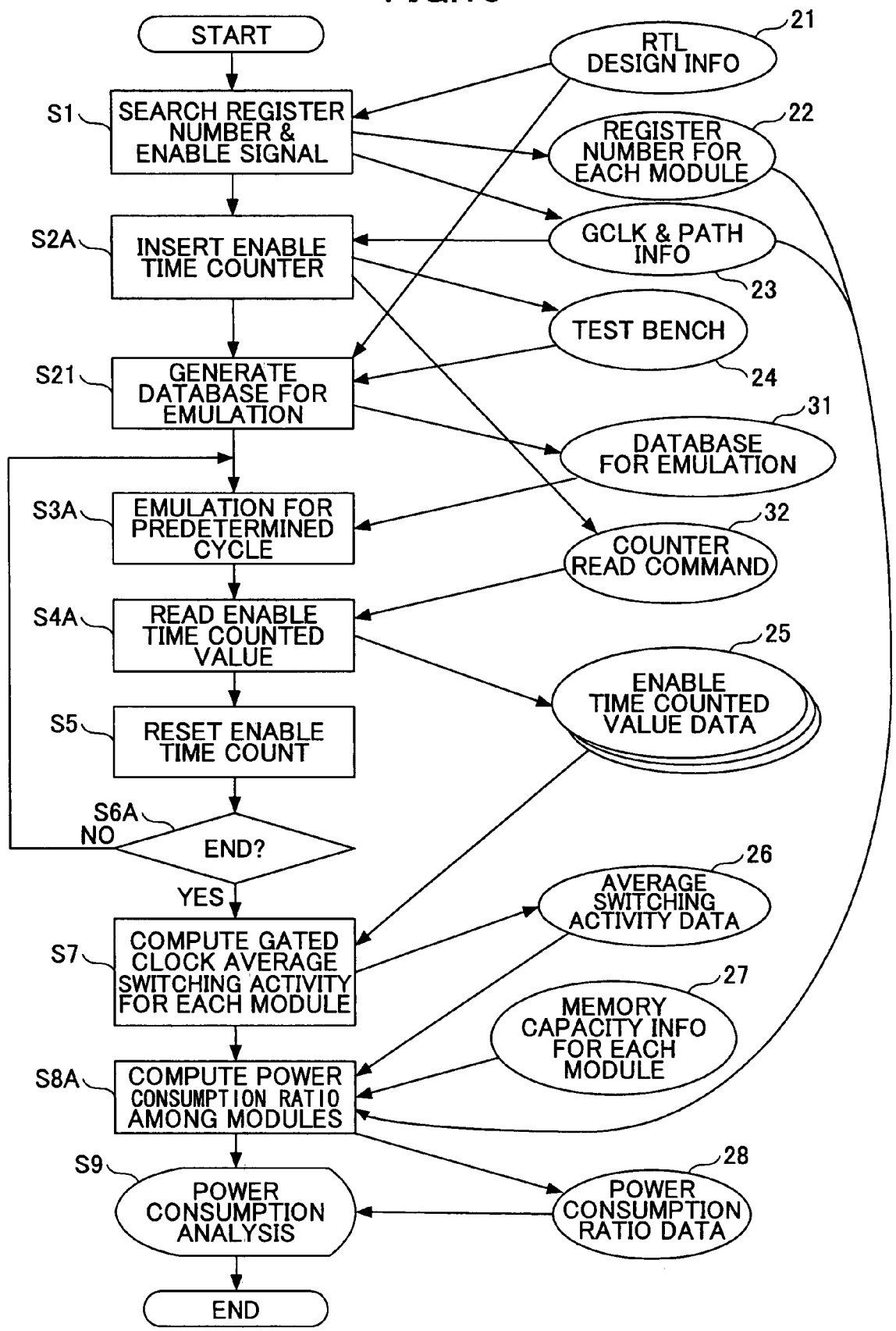
FIG. 10 is a flow chart for explaining the power consumption analyzing process of another embodiment.

FIG. 10 is a flow chart for explaining the power consumption analyzing process of another embodiment. In FIG. 10, those steps that are the same as those corresponding steps in FIG. 6 are designated by the same reference numerals, and a description thereof will be omitted. The process shown in FIG. 10 is executed by the CPU 201 in the RTL design stage which carries out the logic design of the circuit in the semiconductor integrated circuit developing procedure, that is, in the stage prior to the logic synthesis stage which inserts the gated clock with respect to the circuit. The power consumption analyzing process shown in FIG. 10 is made up of an extraction process ST11 that includes steps S1 and S2A, a simulation process ST12 that includes steps S21, S3A, S4A, S5 and S6A, and a post-simulation process ST13 that includes steps S7, S8A and S9. It is assumed for the sake of convenience that the modules, which are function units forming the semiconductor integrated circuit that is the analyzing target, have a hierarchical structure.

This embodiment uses an emulator. The emulator is a hardware simulator, and is capable of carrying out a debugging operation similar to that of the logic simulator used in one embodiment described above, by adding a logic analyzer function such as a signal waveform acquisition to a prototyping board that is formed by a Field Programmable Gate Array (FPGA) or the like.

Normally, a simulation carried out by the emulator is referred to as an emulation. In order to carry out the RTL emulation, it is necessary to temporarily generate a database for the emulation. The differences between the power consumption analyzing processes shown in FIGS. 6 and 10 are caused by the differences between the simulation and the emulation.

Extraction Process ST11:

FIG. 11 is a diagram for generally explaining the extraction process. As shown in FIG. 11, the conditions of the if statements, that may become the enable signal of the gate clock, form the core of the actual RTL design information 21, and thus, a process is carried out to group the conditions of the if statements into a group for each flip-flop. The enable signal of the module indicated by the RTL design information 21 shown in FIG. 11 indicates that it is a signal EN1 of an instance in a hierarchical level U2 which is a hierarchical level lower than an instance in a hierarchical level U1.

For the sake of convenience, FIG. 11 only shows the generation of 1 enable signal, but since a plurality of flip-flops actually exist in 1 module that is indicated by the RTL design information 21, a plurality of enable signals are extracted from the signal name GCLK and the path information 23. In addition, the number of enable signals that are extracted is written in the signal name GCLK and the path information 23. In FIG. 11, the signal name GCLK (enable signal name) and the path information 23 are indicated by an underline.

FIG. 12 is a diagram for explaining generation of the test bench 24. As shown in FIG. 12, the test bench 24 is generated by providing a counter that counts the enable time for all of the enable signals EN based on the files of the signal name GCLK and the path information 23, and adding the counted value of this counter (that is, the counter value) for each module.

In the emulator, because the reading of the counter value is made from a Tc1 command for the emulation control, a file of a counter read command 32 (that is, a counter read command file) is output simultaneously as the generation of the test bench 24. In other words, in FIG. 10, the step S2A generates the test bench 24 that is provided with the counter for measuring the valid time (or enable time) of the extracted signal, from the signal name GCLK and the path information 23 read from the memory part, outputs the counter read command file, and stores the test bench 24 and the counter read command file (counter read command 32) in the memory part.

Emulation Process ST12:

The step S21 generates a database 31 for the emulation using the RTL design information and the test bench 24 that are read from the memory part, and stores the database 31 in the memory part. The step S3A executes an emulation for each predetermined section (that is, predetermined emulation cycle) using the RTL design information 21 and the test bench 24 that are read from the memory part. After completion of the emulation of the predetermined section, the step S4A reads the counted value of the test bench 24, that is, the valid time counted value data 25 using the counter read command file that is read from the memory part, and stores the read counted value in the memory part. The step S5 resets the counter of the test bench 24. The step S6A decides whether or not a predetermined emulation time has elapsed and the emulation has ended. The process returns to the step S3A if the decision result in the step S6A is NO. Accordingly, the process of the steps S3A through S5 is repeated until the predetermined emulation time elapses.

By executing the emulation process ST12, it is possible to obtain the counted value of the counter that counts the enable time.

FIG. 13 is a diagram showing the counter read command file (file of the counter read command 32) that is used when executing the emulation process ST12.

FIG. 14 is a diagram showing a counted value file (file of the valid time counted value data 25) that is an output of the emulation result of the emulation process ST12. In FIG. 14, a section sandwiched between "xxxxxxxxx" is the data of 1 section, and a post-emulation process ST13 is carried out for each such section.

Post-Emulation Process ST13:

The step S8A obtains the power consumption change of the circuit from the gated clock average switching activity data 26 for each module, the register number 22 for each module, the signal name GCLK and the path information 23 read from the memory part, and the memory capacity coefficient 27 for each module.

In this embodiment, it is assumed for the sake of convenience that the semiconductor integrated circuit is an LSI circuit of an image processing system having a total number of approximately 4,000,000 ASIC gates and a total memory (RAM/ROM) capacity of approximately 600 kbytes. In this type of circuit, it is known from experience that according to such a proportion of the total number of gates and the total memory (RAM/ROM) capacity, the ratio of the power consumption of the memory (RAM/ROM) to the total power consumption is approximately 1/6. Accordingly, if the memory capacity coefficient is regarded to be 1+1/6, the power consumption coefficient value can be obtained from the following formula.

(Power Consumption Coefficient Value)=(Register Number)×(Switching Activity)×(1+1/6)

By the process described above, it is possible to obtain the graph of the power consumption change that takes into consideration the effects of the gated clock that is inserted with respect to the circuit in the logic synthesis stage as shown in FIG. 10.

Therefore, this embodiment extracts from the RTL the signal which is judged that it will be transformed into the enable signal of the gated clock by the logic synthesis tool, and measures the valid time (or enable time) of the extracted signal by the emulation. The power consumption value, the power consumption change, the power consumption ratio among the modules forming the circuit and the like are computed from the measured valid time, the number of registers for each of the modules that are function units forming the circuit, and the memory capacity coefficient.

Accordingly, by artificially computing the power consumption change after the gated clock is inserted with respect to the circuit in the RTL design stage of the circuit developing procedure, it is possible to optimize the architecture of the circuit in the RTL design stage.

Next, a description will be given of the optimization of the architecture of the circuit, by referring to FIGS. 15 through 18. FIGS. 15 through 18 are diagrams for explaining the optimization of the architecture of the circuit.

Figure 15:
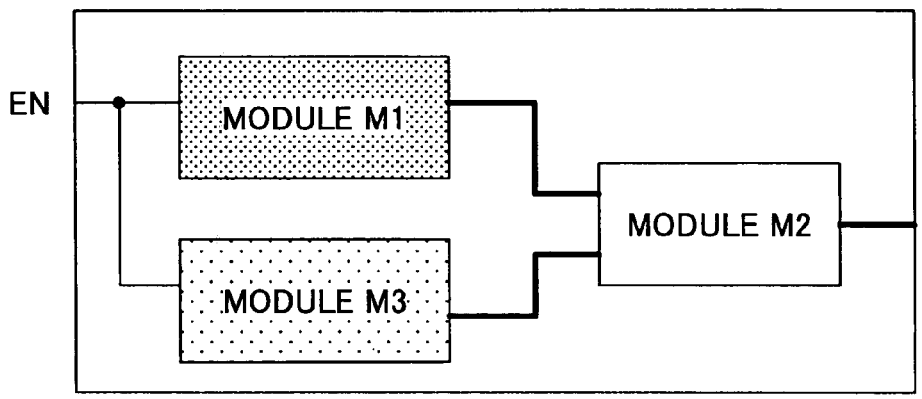
FIG. 15 is a diagram showing a circuit before its architecture is modified.
Figure 16:
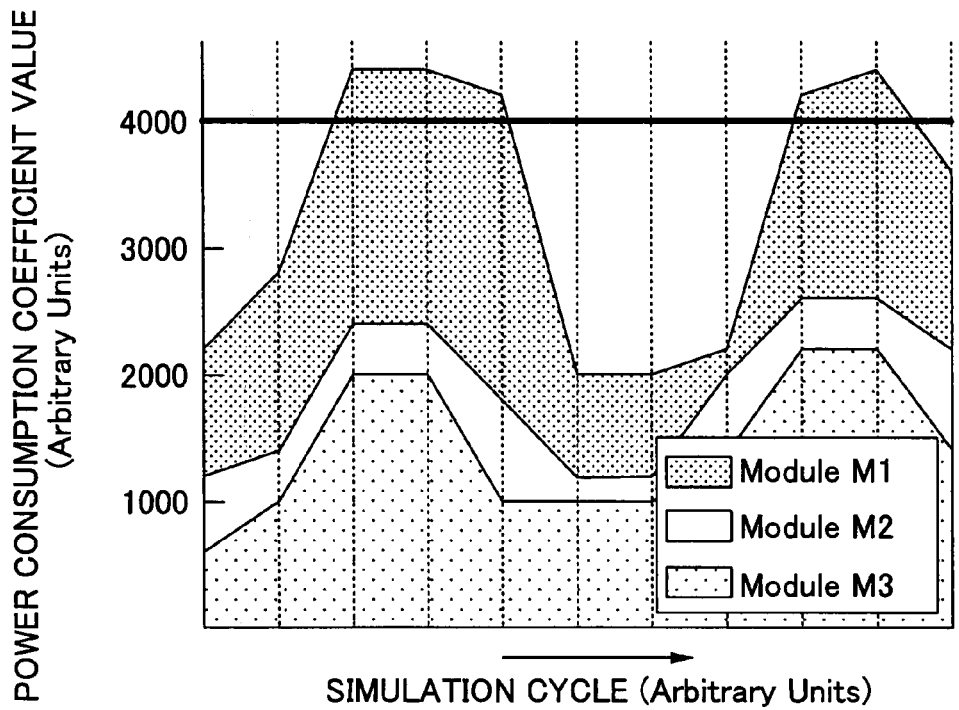
FIG. 16 is a diagram showing a power consumption analysis result of the circuit before its architecture is modified.

FIG. 15 is a diagram showing a circuit before its architecture described by the RTL design information 21 is modified, and FIG. 16 is a diagram showing a power consumption analysis result of the circuit before its architecture is modified. In FIG. 15, an enable signal EN is input to both modules M1 and M3 forming the circuit, outputs of the modules M1 and M3 are input to a module M2, and an output of the circuit is output from the module M2. By carrying out the power consumption analyzing process shown in FIG. 6 or FIG. 10 with respect to the circuit in the RTL design stage shown in FIG. 15, the power consumption analysis result shown in FIG. 16 was obtained. In FIG. 16, the ordinate indicates the power consumption coefficient value with respect to the modules M1 through M3 forming the circuit in arbitrary units, and the abscissa indicates the simulation cycle in arbitrary units.

Figure 17:
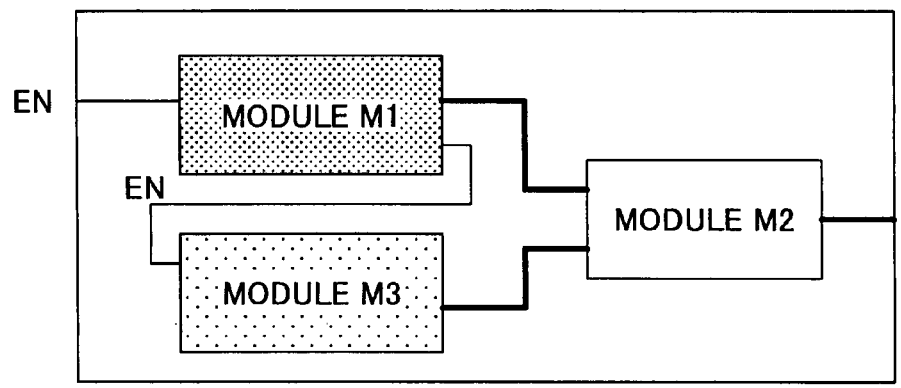
FIG. 17 is a diagram showing the circuit after its architecture is modified.
Figure 18:
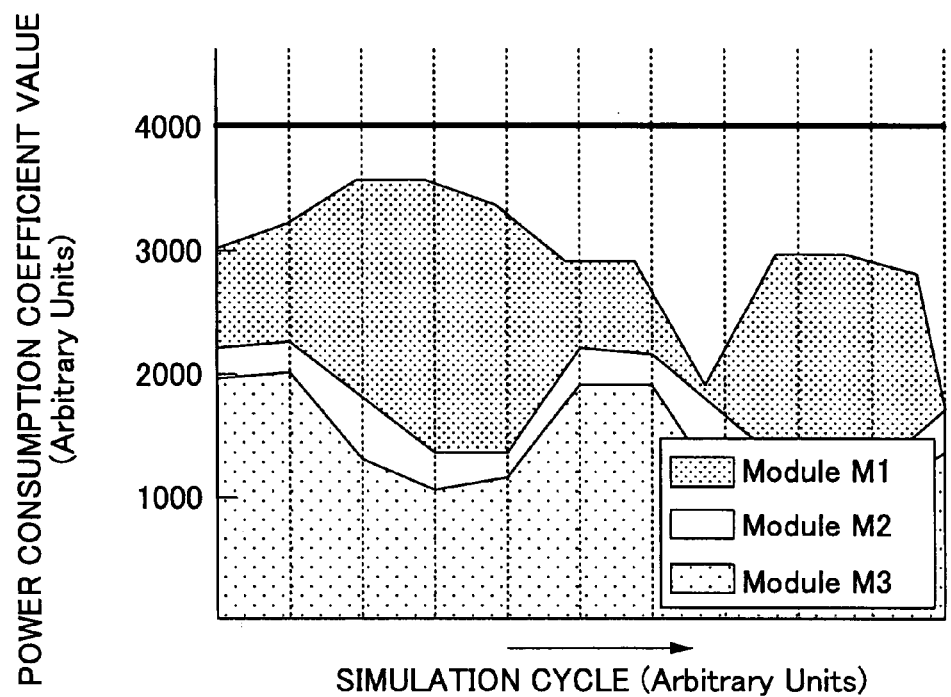
FIG. 18 is a diagram showing a power consumption analysis result of the circuit after its architecture is modified.

FIG. 17 is a diagram showing the circuit after its architecture described by the RTL design information 21 is modified, and FIG. 18 is a diagram showing a power consumption analysis result of the circuit after its architecture is modified. In FIG. 17, an enable signal EN is input to a module M1 forming the circuit, an enable signal EN output from the module M1 is input to a module M3, outputs of modules M1 and M3 are input to a module M2, and an output of the circuit is output from the module M2. By carrying out the power consumption analyzing process shown in FIG. 6 or FIG. 10 with respect to the circuit in the RTL design stage shown in FIG. 17, the power consumption analysis result shown in FIG. 18 was obtained. In FIG. 18, the ordinate indicates the power consumption coefficient value with respect to the modules M1 through M3 forming the circuit in arbitrary units, and the abscissa indicates the simulation cycle in arbitrary units.

As may be seen from FIGS. 15 through 18, it was confirmed that the optimization of the architecture of the circuit is possible in the RTL design stage of the circuit. In other words, in the circuit shown in FIG. 15, the modules M1 and M3 actively operate at the same time, and in the graph of the power consumption analysis result shown in FIG. 16, it was found that the peak portion is extremely high (that is, the power consumption coefficient value is large). Hence, the architecture of the circuit was modified to the architecture shown in FIG. 17 so that the module M1 starts the module M3 depending on the operation state of the module M1. As a result, in the graph of the power consumption analysis result shown in FIG. 18, it was confirmed by that the power changing state is smoothened and the peak portion can be lowered. In other words, it was confirmed that the architecture of the circuit can be optimized in the RTL design stage. The optimization itself of the architecture of the circuit may be carried out automatically by the CPU 201 or, carried out manually by the operator or, carried out by a combination of the automatic optimization of the CPU 201 and the manual optimization of the operator.

Particularly in the case of an equipment that is powered by a battery, there is a limit to the amount of power that can be supplied from the battery per unit time. Accordingly, even if the average power consumption is the same, by lowering the peak portion of the graph of the power consumption analysis result shown in FIG. 16 to the state shown in FIG. 18, it becomes possible to employ a battery that supplies a small amount of power in the case where the architecture shown in FIG. 17 is used compared to the case where the architecture shown in FIG. 15 is used.

This application claims the benefit of a Japanese Patent Application No. 2006-320467 filed Nov. 28, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. A power consumption analyzing method, comprising:
extracting a signal judged as to whether the signal is transformed into a gated clock in a logic synthesis stage;
storing the signal in a memory part;
measuring a valid time of the signal stored in the memory part by a logic simulation;
storing the valid time in the memory part; and
computing a power consumption analysis result of a circuit from the valid time stored in the memory part, a number of registers for each of modules that are function units forming the circuit, and a memory capacity coefficient indicating an extent to which a memory capacity within the circuit affects the power consumption of the circuit, wherein the extracting of the signal includes:

extracting the signal judged whether the signal is transformed into an enable signal of the gated clock after a logic synthesis, from RTL design information stored in the memory part, and storing in the memory part a signal name of the signal and path information from a highest hierarchical level of the module in which the signal exists, together with the number of registers for each module, and generating a test bench that is provided with a counter for measuring a valid time of the signal, from the signal name and the path information read from the memory part, and storing the test bench in the memory part.

2. The power consumption analyzing method as claimed in claim 1, further comprising:

in the computing a power consumption analysis result, computing a power consumption value of the circuit and outputting the power consumption value of the circuit as the power consumption analysis result of the circuit.

3. The power consumption analyzing method as claimed in claim 1, further comprising:

in the computing a power consumption analysis result, computing a power consumption change of the circuit by carrying out a simulation for each predetermined section and measuring the valid time of the signal for each predetermined section, and outputting the power consumption change of the circuit as the power consumption analysis result of the circuit.

4. The power consumption analyzing method as claimed in claim 3, further comprising:

in the computing a power consumption analysis result, obtaining an switching activity indicating a number of transitions in the gated clock per unit time from the valid time, computing the power consumption change of the circuit after the logic synthesis stage and inserted with the gated clock from the switching activity, the number of registers and the memory capacity coefficients, and outputting the power consumption change of the circuit as the power consumption analysis result of the circuit.

5. The power consumption analyzing method as claimed in claim 1, further comprising:

in the computing a power consumption analysis result, displaying the power consumption analysis result of the circuit on a display part.

6. A developing procedure, to be implemented by a computer, developing a semiconductor integrated circuit, comprising:

outputting the power consumption analysis result by carrying out the power consumption analyzing method as claimed in claim 1; and optimizing an architecture of the circuit in the RTL design stage based on the power consumption analysis result.

7. A non-transitory computer-readable storage medium which stores a program causing a computer to make a power consumption analysis, said program comprising:

an extraction procedure causing the computer to extract a signal which is judged that it will be transformed into a gated clock in the logic synthesis stage, and to store the signal in a memory part;

a measuring procedure causing the computer to measure an valid time of the signal stored in the memory part by a logic simulation, and to store the valid time in the memory part; and a post-simulation procedure causing the computer to compute a power consumption analysis result of a circuit from the valid time stored in the memory part, a number of registers for each of modules that are function units forming the circuit, and a memory capacity coefficient indicating an extent to which a memory capacity within the circuit affects the power consumption of the circuit, and to output the power consumption analysis result of the circuit a procedure causing the computer to extract the signal which is judged that it will be transformed into an enable signal of the gated clock after a logic synthesis, from RTL design information stored in the memory part, and to store in the memory part a signal name of the signal and path information from a highest hierarchical level of the module in which the signal exists, together with the number of registers for each module; and a procedure causing the computer to generate a test bench that is provided with a counter for measuring an valid time of the signal, from the signal name and the path information read from the memory part, and to store the test bench in the memory part.

8. The non-transitory computer-readable storage medium as claimed in claim 7, wherein the post-simulation procedure causes the computer to compute a power consumption value of the circuit and to output the power consumption value of the circuit as the power consumption analysis result of the circuit.

9. The non-transitory computer-readable storage medium as claimed in claim 7, wherein the post-simulation procedure causes the computer to compute a power consumption change of the circuit by carrying out a simulation for each predetermined section and measuring the valid time of the signal for each predetermined section, and to output the power consumption change of the circuit as the power consumption analysis result of the circuit.

10. The non-transitory computer-readable storage medium as claimed in claim 9, wherein the post-simulation procedure causes the computer to obtain an switching activity indicating a number of transitions in the gated clock per unit time from the valid time, to compute the power consumption change of the circuit after the logic synthesis stage and inserted with the gated clock from the switching activity, the number of registers and the memory capacity coefficients, and to output the power consumption change of the circuit as the power consumption analysis result of the circuit.

11. The non-transitory computer-readable storage medium as claimed in claim 7, wherein the post-simulation procedure causes the computer to display the power consumption analysis result of the circuit on a display part.

12. The non-transitory computer-readable storage medium as claimed in claim 7, wherein the measuring procedure causes the computer to generate a test bench measuring the valid time of the signal, and to measure the valid time of the signal by carrying out a simulation in units of predetermined sections using the test bench.

13. A non-transitory computer-readable storage medium which stores a program for causing a computer to carry out a semiconductor integrated circuit developing procedure, said program comprising:

an analyzing procedure causing the computer to output the power consumption analysis result by making the power consumption analysis as claimed in claim 7; and an optimizing procedure causing the computer to optimize an architecture of the circuit in the RTL design stage based on the power consumption analysis result.

* * * * *